UNITED STATES PATENT OFFICE.

RICHARD KIRCHHOFF AND EMIL HAUSSMANN, OF BERLIN, GERMANY, ASSIGNORS TO THE ACTIEN-GESELLSCHAFT FÜR ANILIN FABRIKATION, OF SAME PLACE.

BLACK SULFUR DYE.

SPECIFICATION forming part of Letters Patent No. 647,846, dated April 17, 1900.

Application filed January 9, 1900. Serial No. 869. (No specimens.)

*To all whom it may concern:*

Be it known that we, RICHARD KIRCHHOFF and EMIL HAUSSMANN, of Berlin, in the Kingdom of Prussia, German Empire, have invented new and useful Improvements in the Production of Black Dye; and we do hereby declare that the following is a full, clear, and exact description of the invention, which will enable others skilled in the art to which it appertains to make and use the same.

This invention relates to the production of a black sulfureted coloring-matter directly dyeing cotton and is based upon the following observations.

We have discovered that by melting an equimolecular mixture of dinitroöxydiphenylamin:

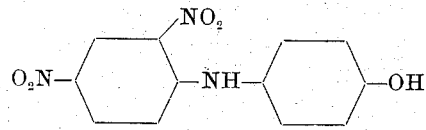

and dinitrophenol:

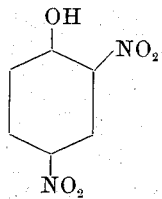

with sulfur and sulfids of alkali metals a black coloring-matter is formed which dyes unmordanted cotton deep-black shades. It could have been expected that the product of the above reaction would be a mixture of the so-called "immedial black," obtained by melting with sulfur and sulfids of alkali metals dinitroöxydiphenylamin and of the dyesuff which results from melting with sulfur and sulfids of alkali metals dinitrophenol alone, (compare United States Letters Patent No. 618,152, of 1899;) but as the new coloring-matter essentially differs by its properties from both these dyestuffs and as besides it has been found impossible to arrive at a similar product by simply mixing both the dyestuffs above mentioned there is no doubt that a new and uniform compound has been formed in which dinitrophenol as well as dinitroöxydiphenylamin have entered into combination with one another and with sulfur.

To further illustrate our invention, we give the following example: One hundred and seventy kilos of sodium sulfid, sixty kilos of sulfur, and fifteen kilos of water are heated up to 80°, and a mixture of twenty kilos of dinitroöxydiphenylamin and 13.2 kilos of dinitrophenol are slowly added thereto. The temperature is then brought first to 125°. After some time it is slowly raised, and it is maintained at last at 140° to 150° until a sample proves that the formation of dyestuff does no more increase.

The dyestuff may be rendered ready for technical use by several ways. Either the product of the reaction is heated up to 160° to 170°, until it is brought to perfect dryness, and may be powdered after refrigeration, or the mixture is dissolved in water and from the solution obtained the dyestuff is precipitated by means of mineral acids or of common salt or by the introduction of a current of carbonic acid or of air. The dark-brownish-green precipitate thus produced is filtered and pressed, the press-cakes are melted with sodium sulfid on the water-bath, and the thick mass is brought to dryness by allowing it to stand in the dry-room or by evaporation on the water-bath. The product obtained by one of these methods is insoluble in alcohol. It dissolves easily in water, forming a bluish-green-black solution, which on addition of sodium sulfid assumes a more bluish-black coloration. From its aqueous solution the dyestuff is precipitated by means of common salt, mineral acids, or carbonic acid in the shape of a dark brownish-green powder. On addition of caustic-soda lye the color of the aqueous solution remains unchanged. By a sufficient quantity of this latter agent, however, the dyestuff is precipitated, forming a green-black powder. In concentrated sulfuric acid it dissolves slowly, producing a dirty olive-green solution, which when allowed to repose for several hours or more quickly when heated assumes a bluish coloration. In fuming sulfuric acid of twenty-three per cent. $SO_3$ it dissolves with bluish-black coloration. Both solutions yield green-black precipitates on dilution with ice or ice-water.

The coloring-matter dyes unmordanted cotton deep-black tints.

Having thus described our invention and in what manner the same can be performed, what we claim as new is—

The black dye produced by melting with sulfur and sulfids of alkali metals an equimolecular mixture of dinitrooxydiphenylamin:

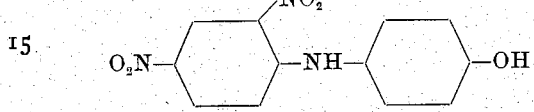

and dinitrophenol:

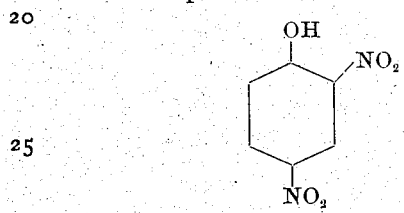

said dye being insoluble in alcohol, easily soluble in water, forming a green-black solution which on addition of sodium sulfid assumes a bluish-black coloration; the dye being precipitated from its aqueous solution by means of common salt, of mineral acids or of carbonic acid, forming a dark brownish-green powder; being precipitated by hot caustic-soda lye in the shape of a black powder; being soluble in concentrated sulfuric acid with dirty olive-green coloration which, when allowed to repose for several hours or more quickly on heating, turns bluish; likewise soluble in fuming sulfuric acid of twenty-three per cent. $SO_3$ with bluish-black coloration, both solutions yielding green-black precipitates on dilution with ice or ice-water; the new coloring-matter dyeing unmordanted cotton directly deep-black shades.

In witness whereof we have hereunto signed our names, this 21st day of December, 1899, in the presence of two subscribing witnesses.

RICHARD KIRCHHOFF.
EMIL HAUSSMANN.

Witnesses:
WOLDEMAR HAUPT,
HENRY HASPER.